United States Patent
Mayne et al.

(10) Patent No.: US 10,926,880 B1
(45) Date of Patent: Feb. 23, 2021

(54) TIMED PASSENGER TRAY WITH INFINITE POSITION

(71) Applicant: Rockwell Collins, Inc., Cedar Rapids, IA (US)

(72) Inventors: Peter Mayne, London (GB); Daniel Flashman, London (GB); Aaron D. LaPrade, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 221 days.

(21) Appl. No.: 16/114,450

(22) Filed: Aug. 28, 2018

(51) Int. Cl.
| | |
|---|---|
| *B64D 11/06* | (2006.01) |
| *A47B 13/08* | (2006.01) |
| *A47B 5/00* | (2006.01) |
| *A47B 5/04* | (2006.01) |
| *B60R 11/00* | (2006.01) |

(52) U.S. Cl.
CPC ...... *B64D 11/0638* (2014.12); *B64D 11/0605* (2014.12); *A47B 5/006* (2013.01); *A47B 5/04* (2013.01); *A47B 13/081* (2013.01); *B60R 2011/0089* (2013.01)

(58) Field of Classification Search
CPC ... B64D 11/0638; B64D 11/0605; A47B 5/04; A47B 13/081; A47B 5/006
See application file for complete search history.

(56) References Cited

U.S. PATENT DOCUMENTS

| | | | | |
|---|---|---|---|---|
| 6,601,523 | B2 * | 8/2003 | Jensen | B60N 3/004 |
| | | | | 108/152 |
| 8,448,581 | B2 * | 5/2013 | Hanna | B64D 11/06 |
| | | | | 108/137 |
| 9,783,303 | B2 * | 10/2017 | Gagnon | B64D 11/06 |
| 10,322,807 | B2 * | 6/2019 | Moulton | B64D 11/0638 |
| 2013/0241246 | A1 | 9/2013 | Round et al. | |
| 2020/0298977 | A1 * | 9/2020 | Frost | B64D 11/0638 |

* cited by examiner

*Primary Examiner* — Brian M O'Hara
(74) *Attorney, Agent, or Firm* — Suiter Swantz pc llo (57) ABSTRACT

A timed passenger tray with infinite position is disclosed. In embodiments, a passenger tray assembly includes a base member with a first gear/pulley coupled to the base member and a passenger tray with a second gear/pulley coupled to the passenger tray. The passenger tray assembly further includes a tray support member extending from the first gear/pulley to the second gear/pulley. The tray support member is configured to support the passenger tray and can rotate about the first gear/pulley when the passenger tray is repositioned. The passenger tray assembly further includes a timing drive at least partially disposed within the tray support member and configured to engage the first and second gears/pulleys so that the first and second gears/pulleys are simultaneously actuated when the passenger tray is repositioned in a manner that causes the tray support member to rotate about the first gear/pulley.

20 Claims, 7 Drawing Sheets

TIMED PASSENGER TRAY WITH INFINITE POSITION

BACKGROUND

Vehicles for mass transport can include, but are not limited to, aircrafts, boats, trains, and busses. Passenger cabins in these types of vehicles are typically designed for long travel durations (e.g., one or more hours of travel). As such, the passenger cabins are often equipped with passenger trays that can be used when passengers want to eat, drink, read, write, use portable devices (e.g., laptops, tablets, etc.), and so forth. Because passengers come in many shapes and sizes, it is important for the passenger trays to be adjustable and/or repositionable.

Some systems allow for limited motion. In some systems, for instance, the passenger tray, once deployed, may be pushed forward (away from the passenger) or pulled backward (toward the passenger). However, there is a need for passenger tray systems that allow for more flexibility.

SUMMARY

In one aspect, embodiments of the inventive concepts disclosed herein are directed to a timed passenger tray with infinite position. In embodiments, a passenger tray assembly includes a base member with a first gear/pulley coupled to the base member and a passenger tray with a second gear/pulley coupled to the passenger tray. The passenger tray assembly further includes a tray support member extending from the first gear/pulley to the second gear/pulley. The tray support member is configured to support the passenger tray and can rotate about the first gear/pulley when the passenger tray is repositioned. The passenger tray assembly further includes a timing drive at least partially disposed within the tray support member and configured to engage the first and second gears/pulleys so that the first and second gears/pulleys are simultaneously actuated when the passenger tray is repositioned in a manner that causes the tray support member to rotate about the first gear/pulley.

In some embodiments, the passenger tray assembly further includes a track that couples the second gear/pulley to the passenger tray. The passenger tray can be configured to slide longitudinally (e.g., forward and backward and/or side-to-side) on the track. In such embodiments, the ability to slide the tray longitudinally can provide even more flexibility with regard to repositioning and/or adjusting the passenger tray.

In some embodiments, the passenger tray assembly further includes an actuator coupled to the first gear/pulley and/or the timing drive. The actuator may be configured to reposition the passenger tray by rotating the tray support member about the first gear/pulley. In such embodiments, the passenger tray assembly can be fully/partially automated.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

Broadly, embodiments of the inventive concepts disclosed herein are directed to a timed passenger tray with infinite position. Because passengers come in many shapes and sizes, it is important for passenger trays (e.g., meal, beverage, and/or activity trays) to be adjustable and/or repositionable. In embodiments of the present disclosure, a passenger tray assembly employs a timing drive to implement a passenger tray with infinite position. The timing drive can be configured to maintain the passenger tray in a parallel orientation relative to a seat back (hence, parallel to the seated passenger's torso) at all times while the passenger tray is repositioned (e.g., stowed, deployed, and/or adjusted). For example, the timing drive can be configured to synchronize the rotation of a first gear/pulley that is coupled to the passenger tray and a second gear/pulley that is coupled to a base member so that the first and second gears/pulleys are simultaneously actuated when the passenger tray is repositioned in a manner that causes a tray support member (e.g., a pivot arm) to rotate about the first gear/pulley. When the tray support member rotates about the first gear/pulley, the timing drive causes the second gear/pulley and the passenger tray that is coupled to the second gear/pulley to rotate relative to the tray support member so that the passenger tray remains in a parallel orientation relative to the seat back. In some embodiments, the passenger tray is also longitudinally repositionable (e.g., configured to slide forward and backward and/or side-to-side) and/or at least partially automated. Details of the various configurations are discussed below with reference to FIGS. 1 through 7.

Figure 1:
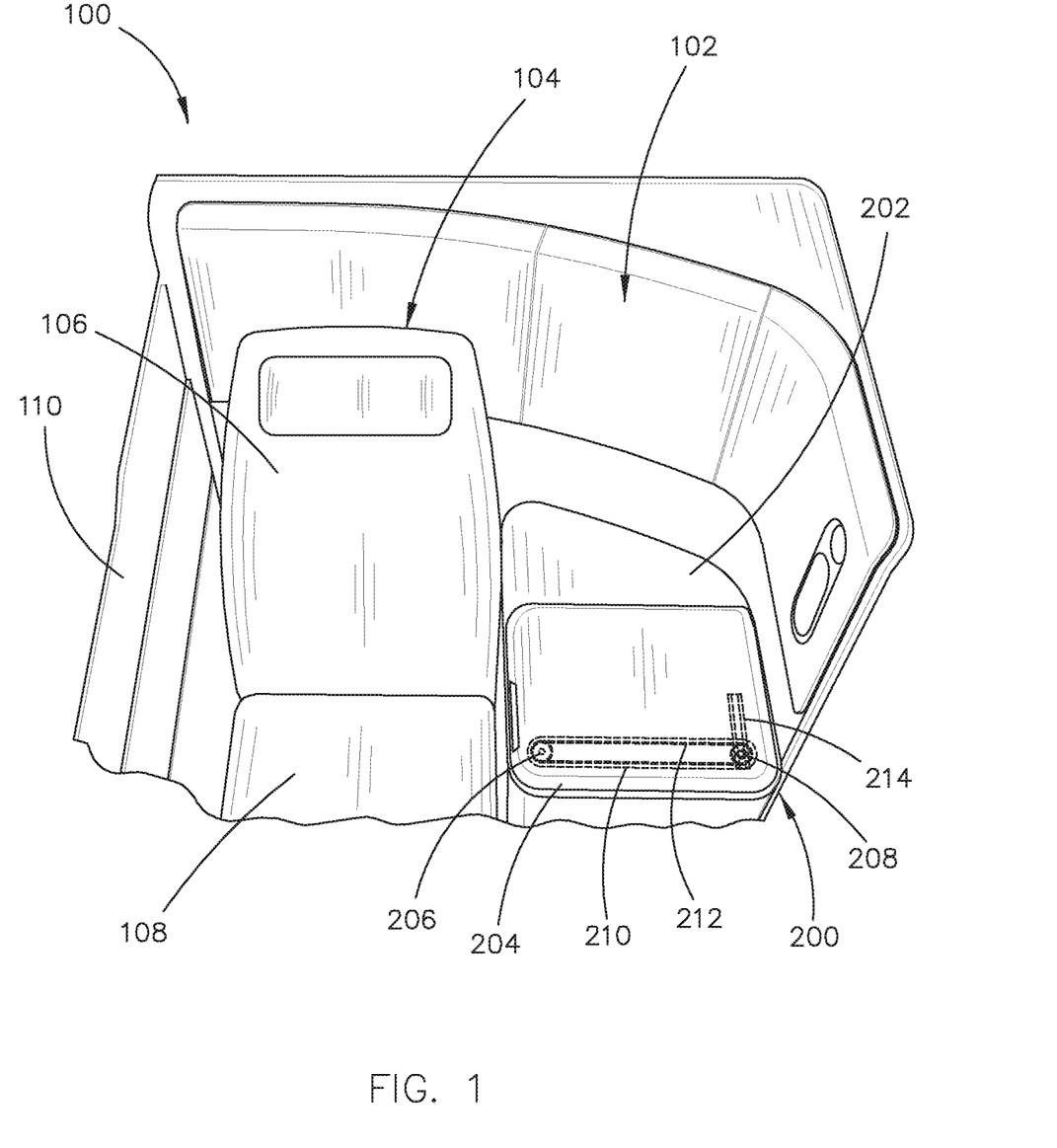
FIG. 1 is a perspective view of a passenger seating system that includes a passenger tray assembly with a passenger tray in a stowed position, in accordance with an example embodiment of this disclosure.
Figure 2:
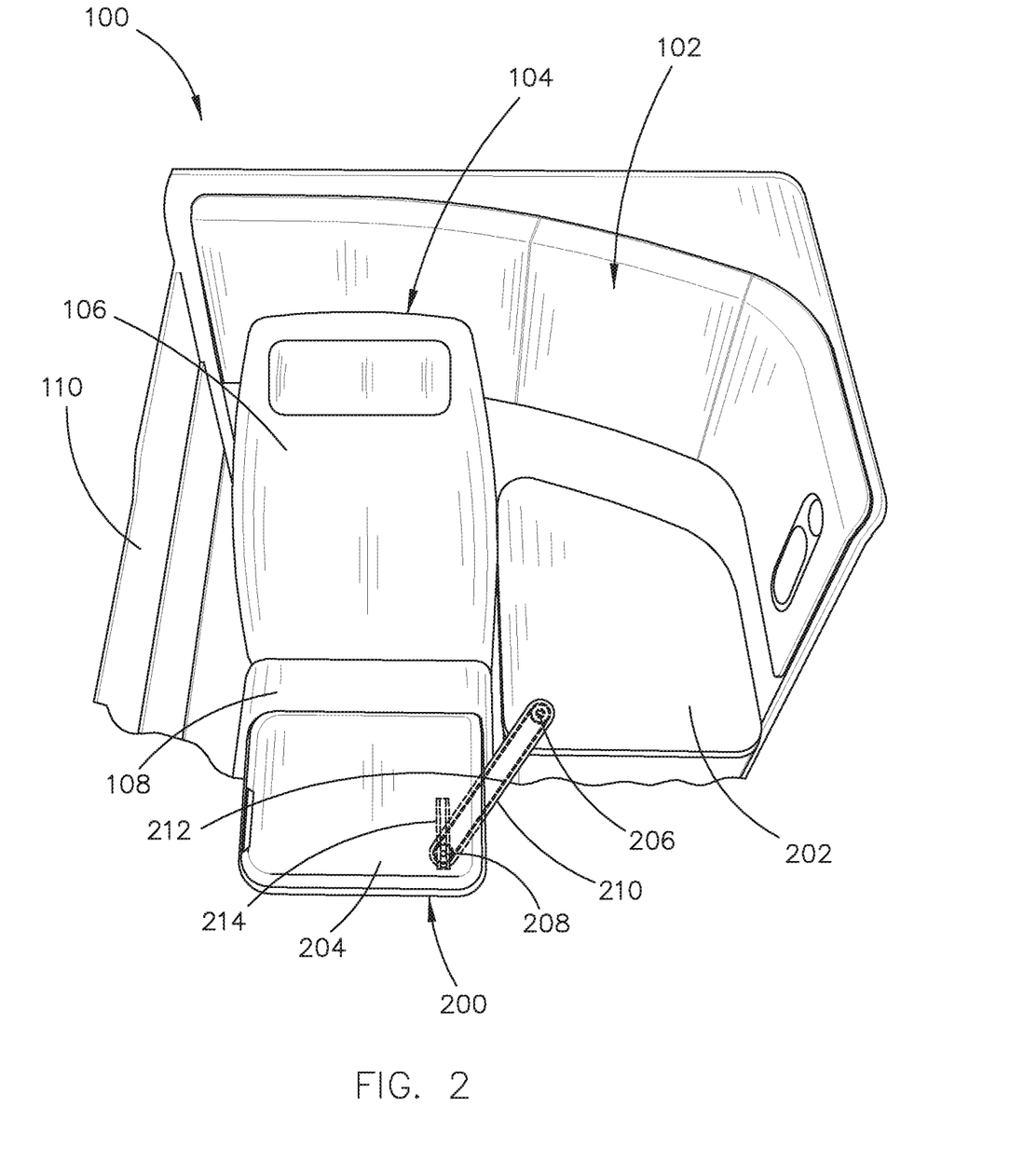
FIG. 2 is a perspective view of the passenger seating system that includes the passenger tray assembly with the passenger tray in a deployed position, in accordance with an example embodiment of this disclosure.
Figure 3:
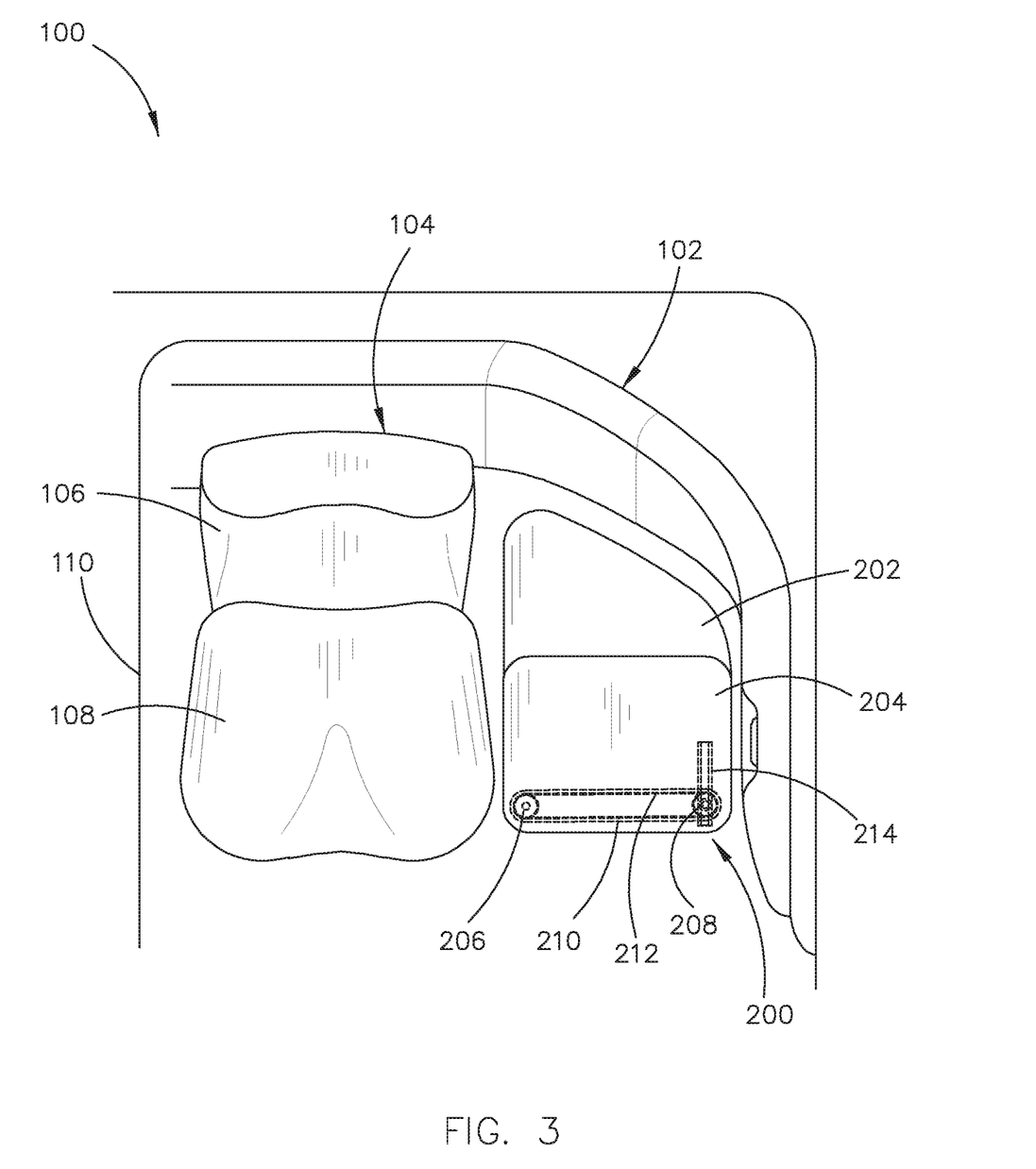
FIG. 3 is a top view of the passenger seating system that includes the passenger tray assembly with the passenger tray in a stowed position, in accordance with an example embodiment of this disclosure.

FIG. 1 illustrates a passenger seating system 100 includes a passenger tray assembly 200. The passenger seating system 100 may include passenger seating modules 102, rows, or the like, in a passenger cabin of an aircraft or any other vehicle. In an example embodiment, the passenger tray assembly 200 is incorporated into a seating module 102 (e.g., a business-class or elite-class compartment) aboard a commercial aircraft or like seating area aboard a business jet or luxury aircraft.

The seating module 102 includes a passenger chair 104. In embodiments, the passenger chair 104 includes an upper body support member 106 (e.g., a seat back) and a seat 108. In some embodiments, the upper body support member 106 and the seat 108 may be separate structures disposed adjacent to one another. Alternatively, the upper body support member 106 and the seat 108 can have one or more shared components. For example, the upper body support member 106 and the seat 108 can have a shared cushion or covering, one or more shared mechanical linkages, and/or one or more shared actuators. The upper body support member 106 may be configured to move relative to the seat 108. For example, the upper body support member 106 can be configured to transition between upright and reclined positions. In some embodiments, the seat 108 is also repositionable. For example, the seat 108 may be configured to move forward/backward, upward/downward, and/or tilt. The seat 108 and the upper body support member 106 may be simultaneously actuated to transition from a sitting to a laying position. For example, the seat 108 may actuate forwards while the upper body support member 106 reclines to place the passenger chair 104 in a bed-like configuration. In some embodiments, the passenger chair 104 can also include one or more armrests or armrest consoles adjacent to (e.g., on a left or right side) of the seat 108.

The seating module 102 may further include at least one partition 110 for partially demarcating the passenger chair 104 from the cabin proper (e.g., defining a private area or a communal area). In embodiments, the seating module 102 can include a manually actuated partition 110 or an automated partition 110. For example, in some embodiments, the partition 110 may be manually actuated (e.g., raised, lowered, slid, unfolded, latched/unlatched, etc.) to open or close an entrance to the seating module 102. In other embodiments, the partition 110 may be transitioned between open and closed positions by one or more actuators (e.g., motors, linear actuators, or the like). In some embodiments, the seating module 102 may include one or more control interfaces that generate signals to cause the actuators to open or close the partition 110 based upon a user interaction (e.g., pressed button, toggled switch, etc.).

The passenger tray assembly 200 can be implemented within the seating module 102. However, this is one example implementation, and in other embodiments, the passenger tray assembly 200 may be implemented in a differently configured passenger seating system 100.

As shown in FIGS. 1 through 5, the passenger tray assembly 200 includes a base member 202 and a passenger tray 204 that is coupled to the base member 202 by a tray support member 210. In embodiments, the base member 202 can be attached to or can make up a portion of an arm rest, a center console, a pedestal, a wall, another passenger chair, or any other fixture in the passenger cabin that is adjacent to the passenger chair 104. The base member 202 has a first gear/pulley 206 coupled to the base member 202 and configured to rotate about a fixed point (i.e., a pivot) on the base member 202. One end of the tray support member 210 is coupled to the first gear/pulley 206 so that the tray support member 210 is configured to rotate about the first gear/pulley 206. Another end of the tray support member 210 is coupled to a second gear/pulley 208. The second gear/pulley 208 is coupled to the passenger tray 204 so that the tray support member 210 extends from the first gear/pulley 206 to the second gear/pulley 208 and supports the passenger tray 204.

The tray support member 210 is configured to suspend the passenger tray 204 from the fixed point (i.e., the pivot) that the first gear/pulley 206 is coupled to on the base member 202 so that the passenger tray 204 can be repositioned by pulling/pushing the passenger tray in a manner that causes the tray support member 210 to rotate about the first gear/pulley 206. The tray support member 210 has a timing drive 212 at least partially disposed within the tray support member 210. The timing drive 212 is configured to engage the first and second gears/pulleys 206 and 208 so that the first and second gears/pulleys 206 and 208 are simultaneously actuated when the passenger tray 204 is repositioned in a manner that causes the tray support member 210 to rotate about the first gear/pulley 206.

In some embodiments, the timing drive 212 comprises a timing chain/belt wrapped around the first and second gears/pulleys 206 and 208 (e.g., as shown in FIGS. 1 through 5), where the timing chain/belt is configured to rotate the second gear/pulley 208 when the first gear/pulley 206 is rotated, and vice versa. In other embodiments, such as the embodiment shown in FIG. 6, the timing drive 212 includes a plurality of spur gears 216 disposed between the first and second gears/pulleys 206 and 208, where the rotation of the first gear/pulley 206 causes the spur gears 216 to rotate and drive the second gear/pulley 208, and vice versa. In further embodiments, the timing drive 212 may include a combination of timing chains, belts, and/or gears configured so that the timing drive 212 causes the second gear/pulley 208 to rotate when the first gear/pulley 206 is rotated and similarly causes the first gear/pulley 206 to rotate when the second gear/pulley 208 is rotated.

Figure 4:
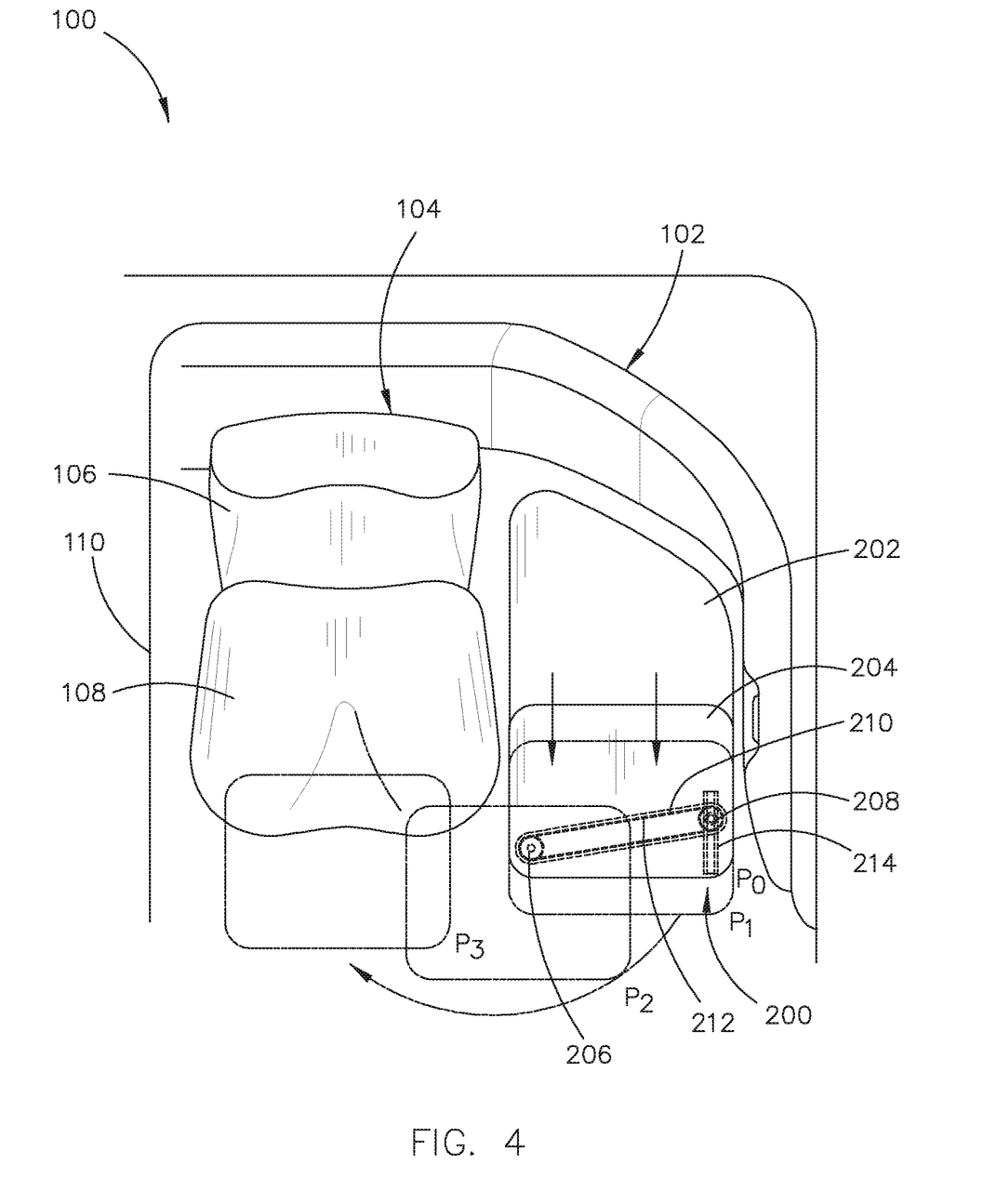
FIG. 4 is a top view of the passenger seating system that includes the passenger tray assembly with the passenger tray being repositioned by rotating the passenger tray out from a base member and/or sliding the passenger tray longitudinally (e.g., forward/backward), in accordance with an example embodiment of this disclosure.
Figure 5:
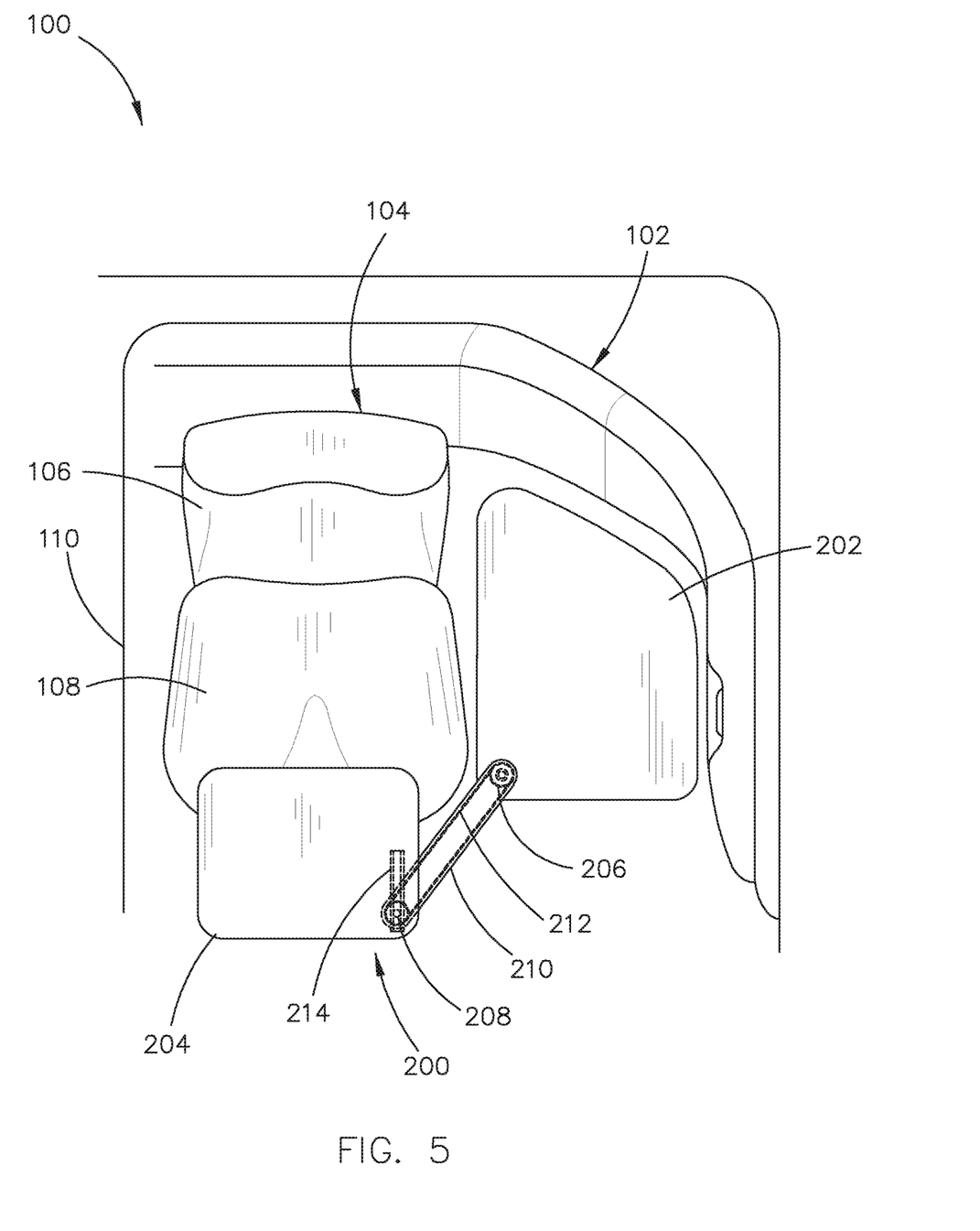
FIG. 5 is a top view of the passenger seating system that includes the passenger tray assembly with the passenger tray in a deployed position, in accordance with an example embodiment of this disclosure.
Figure 6:
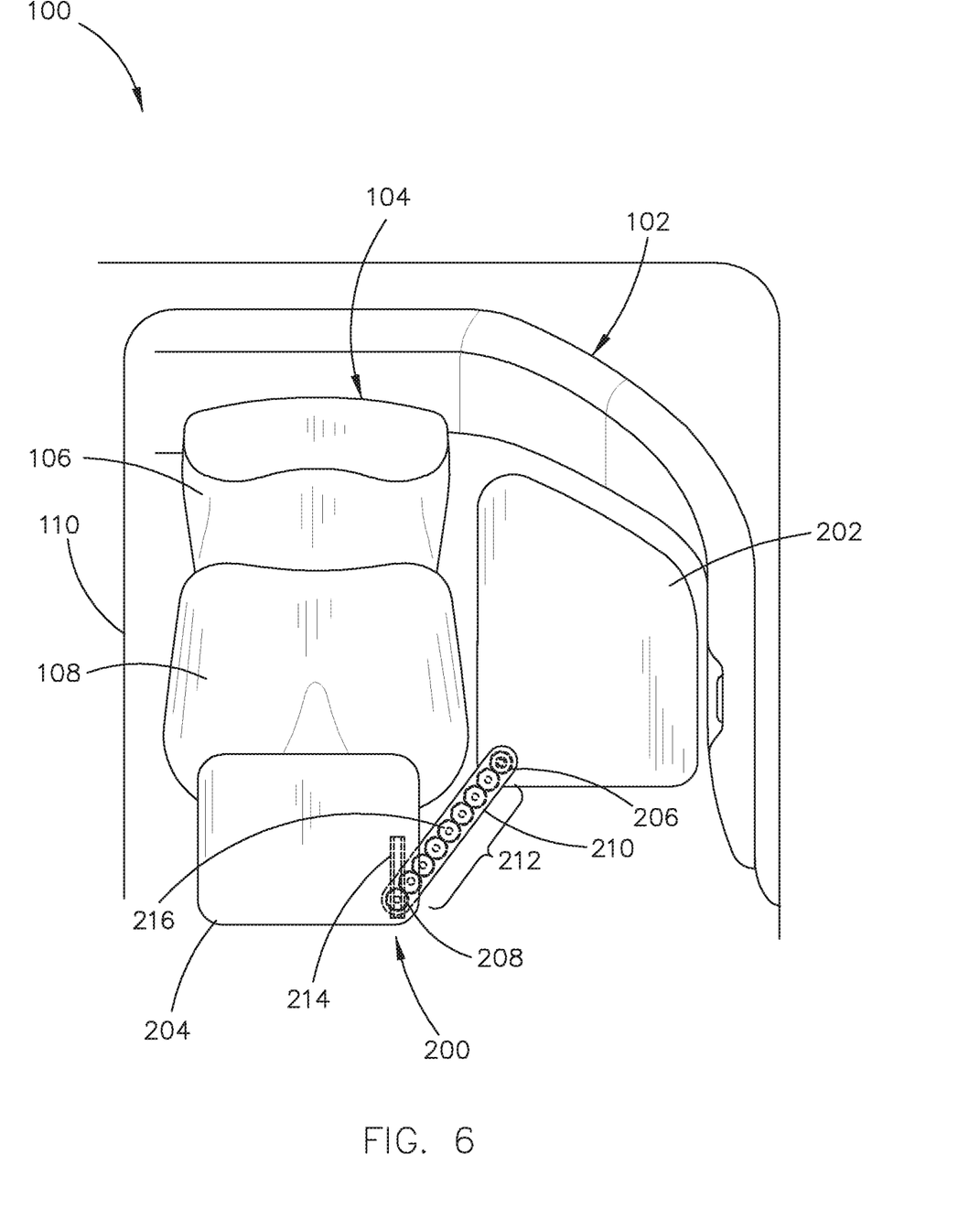
FIG. 6 is a top view of the passenger seating system that includes the passenger tray assembly with the passenger tray in a deployed position, wherein a timing drive of the passenger tray assembly includes a plurality of spur gears, in accordance with an example embodiment of this disclosure.

The passenger tray 204 is configured to maintain a fixed orientation with respect to the second gear/pulley 208. For example, the passenger tray 204 has the same orientation relative to the second gear/pulley 208 in a stowed position (FIG. 1) or a deployed position (FIG. 2) and even when the passenger tray 204 is being repositioned (e.g., as shown in FIG. 4, where the passenger tray 204 is moved between positions $P_0$-$P_4$). This is accomplished by the timing drive 212 synchronizing the first and second gears/pulleys 206 and 208 so that the second gear/pulley 208 rotates to keep the passenger tray 204 in the fixed orientation with respect to the second gear/pulley 208 when the tray support member 210 is rotated about the first gear/pulley 206 (i.e., when the tray support member 210 is rotated, thereby causing a rotation of the first gear/pulley 206). In this manner, the timing drive 212 can be configured to maintain the passenger tray 204 in a parallel orientation relative to the seat back 106 (hence, parallel to the seated passenger's torso) at all times while the passenger tray 204 is repositioned (e.g., stowed, deployed, and/or adjusted). For example, FIG. 4 illustrates how the passenger tray 204 is maintained in a parallel orientation relative to the seat back 106 as the passenger tray 204 is moved between positions $P_1$, $P_2$, and $P_3$ by moving the passenger tray 204 in a manner that causes a tray support member 210 to rotate about the first gear/pulley 206.

In embodiments, the tray support member 210 is infinitely repositionable about the first gear/pulley 206. For example, the tray support member 210 may be rotated about the first gear/pulley 206 via continuous (rather than discrete) motion, where the passenger tray 204 and tray support member 210 can be stopped at any position within the range of motion of the tray support member 210. In some embodiments, the tray support member 210 may have a range restriction on its rotation about the first gear/pulley 206. For example, the passenger tray assembly 200 may include a stopper or barrier that limits the range of motion for the tray support member 210 (e.g., to a rotational range limit in the range of 180 to 270 degrees). In other embodiments, the tray support member 210 can be configured to rotate at least 360 degrees (i.e., at least one full rotation) about the first gear/pulley 206. For example, the first gear/pulley 206 can be configured to freely rotate about the fixed point (i.e., the pivot). In this regard, the tray support member 210 may have an unlimited range of motion (rotationally, that is).

In some embodiments, the passenger tray 204 is also longitudinally translatable. For example, the passenger tray 204 may be configured to slide back and forth (e.g., between positions $P_0$ and $P_1$) and/or side-to-side on at least one track 214 that is coupled to the second gear/pulley 208. In other embodiments, the track 214 may be coupled to another portion of the passenger tray assembly 200. For example, the track 214 may be coupled to the first gear/pulley 206, where the passenger tray 204 and tray support member 210 can both be configured to slide longitudinally so that the passenger tray 204 can be repositioned by swinging the passenger tray 204 out from the base member 202 and also shifting the tray forward, backward, to right, or to the left relative to the passenger chair 104 (i.e., relative to the seated passenger).

Figure 7:
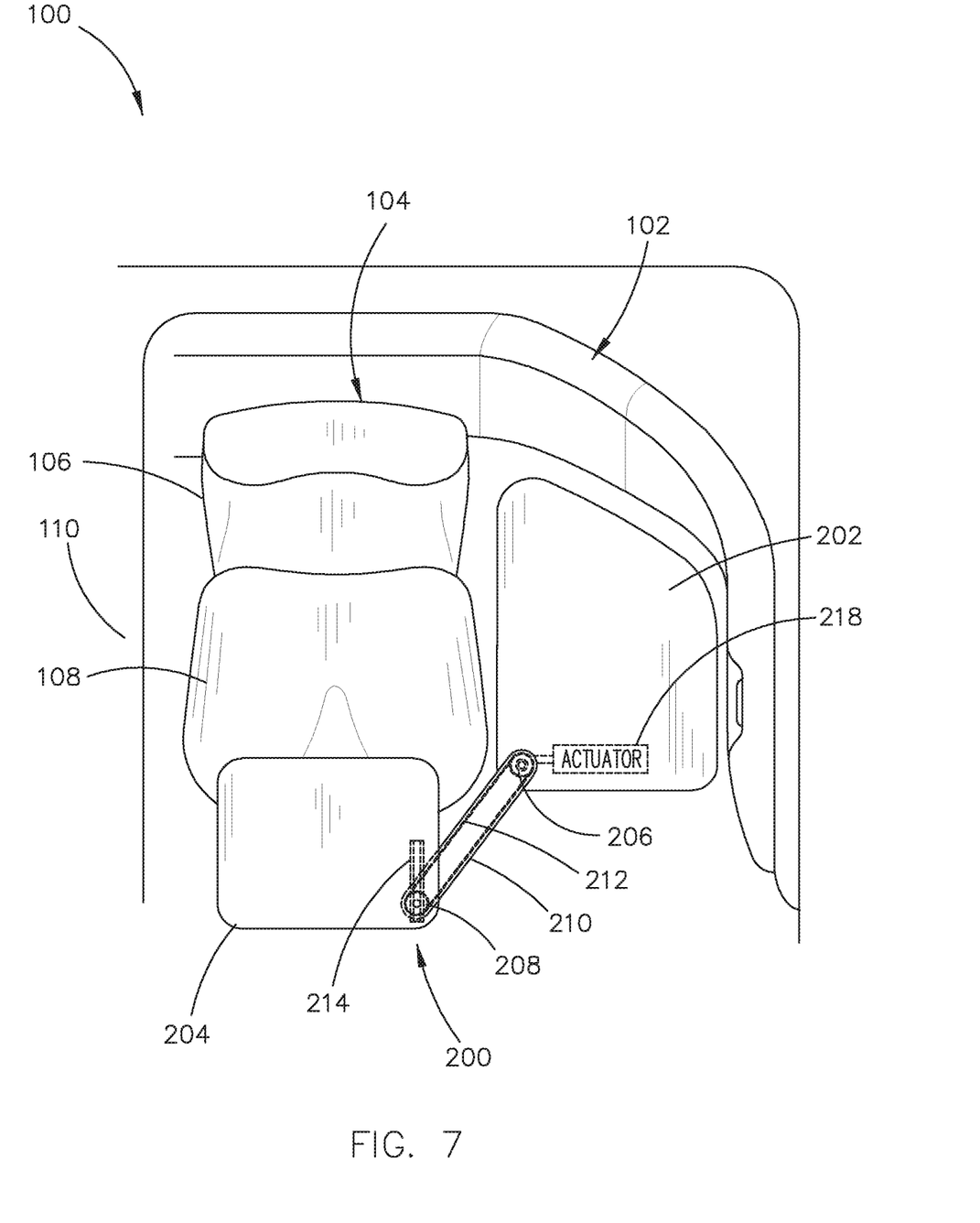
FIG. 7 is a top view of the passenger seating system that includes the passenger tray assembly with the passenger tray in a deployed position, wherein a timing drive of the passenger tray assembly is coupled to an actuator for repositioning the passenger tray, in accordance with an example embodiment of this disclosure.

As shown in FIG. 7, in some embodiments, the passenger tray assembly 200 can be at least partially automated. For example, the passenger tray assembly 200 can include at least one actuator 218 (e.g., a motor) coupled to the first gear/pulley 206 and/or the timing drive 212. The actuator 218 may be configured to reposition the passenger tray 204 by turning the first gear/pulley 206 and/or driving the timing drive 212 to rotate the tray support member 210 about the first gear/pulley 206. In some embodiments, the passenger tray assembly 200 may further include one or more control interfaces (e.g., attached to the base member 202, passenger tray 204, or part of the seating module 102) that generate signals to cause the actuator 218 to deploy, stow, or reposition the passenger tray 204 (by actuating the tray support member 210) based upon a user interaction (e.g., pressed button, toggled switch, etc.).

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger tray assembly, comprising:
   a base member fixed in place within a passenger seating system adjacent to a passenger chair in the passenger seating system;
   a first gear or pulley coupled to the base member and configured to rotate about a fixed point on the base member;
   a passenger tray;

a second gear or pulley coupled to the passenger tray;

a tray support member extending from the first gear or pulley to the second gear or pulley and configured to support the passenger tray; and a timing drive at least partially disposed within the tray support member and configured to engage the first and second gears or pulleys so that the first and second gears or pulleys are simultaneously actuated when the passenger tray is repositioned in a manner that causes the tray support member to rotate about the first gear or pulley, the passenger tray configured to rotate about a single axis through the first gear or pulley relative to the base member.

2. The passenger tray assembly of claim 1, wherein the timing drive comprises a timing chain wrapped around the first and second gears or pulleys.

3. The passenger tray assembly of claim 1, wherein the timing drive comprises a timing belt wrapped around the first and second gears or pulleys.

4. The passenger tray assembly of claim 1, wherein the timing drive comprises a plurality of spur gears disposed between the first and second gears or pulleys.

5. The passenger tray assembly of claim 1, wherein the tray support member is infinitely repositionable about the first gear or pulley.

6. The passenger tray assembly of claim 1, wherein the passenger tray is configured to maintain a fixed orientation with respect to the second gear or pulley.

7. The passenger tray assembly of claim 1, further comprising an actuator coupled to at least one of the first gear or pulley or the timing drive and configured to reposition the passenger tray by rotating the tray support member about the first gear or pulley.

8. A passenger tray assembly, comprising:
a base member fixed in place within a passenger seating system adjacent to a passenger chair in the passenger seating system;
a first gear or pulley coupled to the base member and configured to rotate about a fixed point on the base member;
a passenger tray;
a second gear or pulley;
a track coupled to the second gear or pulley and to the passenger tray, the passenger tray being configured to slide longitudinally on the track;
a tray support member extending from the first gear or pulley to the second gear or pulley and configured to support the passenger tray; and
a timing drive at least partially disposed within the tray support member and configured to engage the first and second gears or pulleys so that the first and second gears or pulleys are simultaneously actuated when the passenger tray is repositioned in a manner that causes the tray support member to rotate about the first gear or pulley,
the passenger tray configured to rotate about a single axis through the first gear or pulley relative to the base member.

9. The passenger tray assembly of claim 8, wherein the timing drive comprises a timing chain wrapped around the first and second gears or pulleys.

10. The passenger tray assembly of claim 8, wherein the timing drive comprises a timing belt wrapped around the first and second gears or pulleys.

11. The passenger tray assembly of claim 8, wherein the timing drive comprises a plurality of spur gears disposed between the first and second gears or pulleys.

12. The passenger tray assembly of claim 8, wherein the tray support member is infinitely repositionable about the first gear or pulley.

13. The passenger tray assembly of claim 8, wherein the track is configured to maintain a fixed orientation with respect to the second gear or pulley.

14. The passenger tray assembly of claim 8, further comprising an actuator coupled to at least one of the first gear or pulley or the timing drive and configured to reposition the passenger tray by rotating the tray support member about the first gear or pulley.

15. A passenger seating system, comprising:
a passenger chair;
a base member fixed in place adjacent to the passenger chair;
a first gear or pulley coupled to the base member and configured to rotate about a fixed point on the base member;
a passenger tray;
a second gear or pulley coupled to the passenger tray;
a tray support member extending from the first gear or pulley to the second gear or pulley and configured to support the passenger tray; and
a timing drive at least partially disposed within the tray support member and configured to engage the first and second gears or pulleys so that the first and second gears or pulleys are simultaneously actuated when the passenger tray is repositioned in a manner that causes the tray support member to rotate about the first gear or pulley,
the passenger tray configured to rotate about a single axis through the first gear or pulley relative to the base member.

16. The passenger seating system of claim 15, wherein the timing drive comprises at least one of a timing chain wrapped around the first and second gears or pulleys, a timing belt wrapped around the first and second gears or pulleys, or a plurality of spur gears disposed between the first and second gears or pulleys.

17. The passenger seating system of claim 15, wherein the tray support member is infinitely repositionable about the first gear or pulley.

18. The passenger seating system of claim 15, wherein the passenger tray is configured to maintain a fixed orientation with respect to the second gear or pulley.

19. The passenger seating system of claim 15, further comprising a track that couples the second gear or pulley to the passenger tray, the passenger tray being configured to slide longitudinally on the track.

20. The passenger seating system of claim 15, further comprising an actuator coupled to at least one of the first gear or pulley or the timing drive and configured to reposition the passenger tray by rotating the tray support member about the first gear or pulley.

* * * * *